United States Patent [19]
Winterfeldt et al.

[11] 3,894,029
[45] July 8, 1975

[54] PRODUCTION OF CAMPTOTHECIN AND CAMPTOTHECIN-LIKE COMPOUNDS

[75] Inventors: Ekkehard Winterfeldt, Grossburgwedel; Tilmann Korth, Hannover, both of Germany

[73] Assignee: Badische Anilin- & Soda-Fabrik Aktiengesellschaft, Ludwigshafen, Rhine, Germany

[22] Filed: Aug. 16, 1972

[21] Appl. No.: 281,115

[30] Foreign Application Priority Data
Aug. 26, 1971  Germany............................ 2142715
Oct. 8, 1971  Germany............................ 2150234

[52] U.S. Cl...... 260/287 R; 260/295 A; 260/295 T; 260/289 A; 424/258
[51] Int. Cl............................................. C07d 39/00

[58] Field of Search..................... 260/287 R, 289 A

[56] References Cited
OTHER PUBLICATIONS

Chem. and Eng. News, July 11, 1966, p. 19.
Chem. and Eng. News, Dec. 12, 1966, pp. 64–68.
Winterfeldt et al., Chem. Commun., Vol. 1971, pp. 374–375.

*Primary Examiner*—Donald G. Daus
*Attorney, Agent, or Firm*—Johnston, Keil, Thompson & Shurtleff

[57] ABSTRACT

Camptothecin, camptothecin-like compounds, and their production, a hydroxyl group being introduced into the lactone ring of the skeleton of camptothecin.

4 Claims, No Drawings

PRODUCTION OF CAMPTOTHECIN AND CAMPTOTHECIN-LIKE COMPOUNDS

Camptothecin, which is a naturally occurring substance, is known to exhibit antitumor activity. Its synthetic production and the possibility of obtaining other variants of this class of compound by modification of the molecular structure are of great importance for industry, research and medicine.

The invention relates to compounds for formula (I):

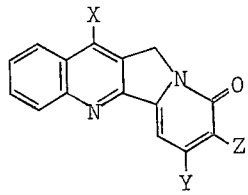   (I)

where
X is hydrogen, chlorine, bromine, alkoxy or dialkylamino;
Y is —CH(COOR)$_2$;
Z is —CH$_2$OH;
Y and Z together are

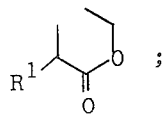;

R is a sterically hindering alkyl; and
R$^1$ is hydrogen or alkyl;
and compounds of formula (I'):

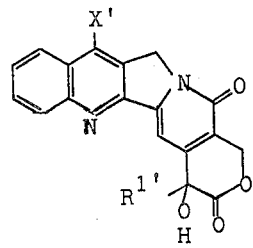   (I')

where
X' is chlorine, bromine, alkoxy or dialkylamino and
R$^{1'}$ is ethyl.

Examples of alkoxy and dialkylamino groups for X and X' are propoxy, butoxy, hexoxy, dipropylamino, dibutylamino, N-methyl-N-butylamino, N-ethyl-N-butylamino and preferably methoxy, ethoxy, dimethylamino or diethylamino.

Particularly suitable sterically hindering alkyl radicals are tertiary alkyl radicals, for example tertiary amyl or tertiarybutyl.

Examples of radicals R$^1$ are methyl, propyl, butyl and preferably ethyl.

In order to prepare a compound of formula (I), a compound of formula (II)

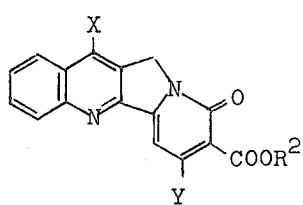   (II)

where R$^2$ is n-alkyl of one to four carbon atoms is reduced to a compound of formula (III)

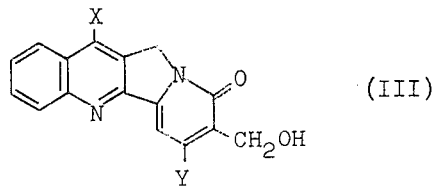   (III)

which is converted, if desired with hydrolysis of the ester group and decarboxylation, into a lactone of formula (IV)

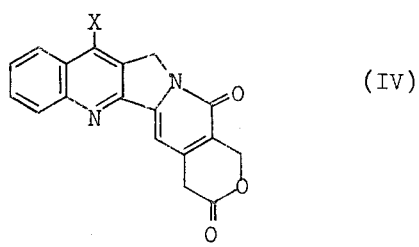   (IV)

which if desired is alkylated to a compound of formula (V):

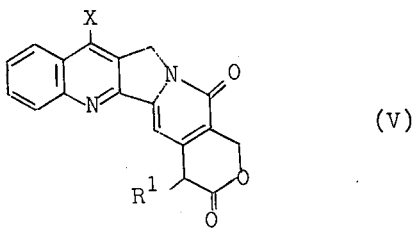   (V)

R$^1$, X and Y have the meanings given above and R$^2$ is preferably methyl or ethyl.

In order to prepare a compound of formula (I') and the corresponding compound with hydrogen instead of X' (= X), a compound of the formula (V) in which R$^1$ is ethyl (R$^{1'}$)

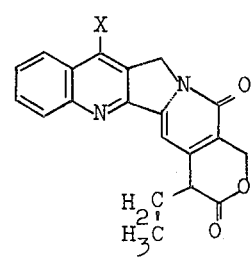

(a) X = H; (b) X = Cl, Br; (c) X = alkoxy, dialkylamino; may be selectively oxidized to a compound of the formula (I')

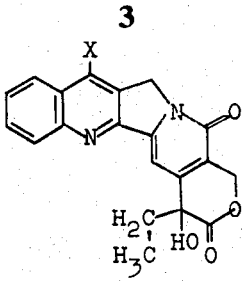

(a) X = H; (b) X = Cl; (c) X = alkoxy, dialkylamino; by allowing molecular oxygen to act on the dissolved compound (V) in the presence of an oxidation catalyst, preferably in the presence of an amine.

The reduction of compounds of formula (II) is carried out with boron hydrides, monoalkylboron hydrides, dialkylboron hydrides, preferably monoalkylaluminum hydrides, particularly dialkylaluminum hydrides. Examples of suitable solvents are ethers, for example ethylene glycol dimethyl ether, diethylene glycol dimethyl ether, the corresponding ethyl or butyl ethers, tetrahydrofuran and dioxane.

Compounds of formula (II) where X is chlorine are obtained according to the process of German Patent, application No. P 20 23 514.7 of May 14, 1970, said application corresponding to U.S. Ser. No. 206,922, which was filed on Dec. 10, 1971.

This process involves a reaction sequence which may be illustrated by initial reaction of an ester having the formula (VI):

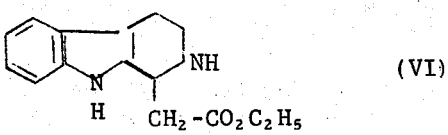

[G. B. Kline, J.Amer.Chem.Soc., 81, 2251 (1959)] with a monoalkyl malonate to form an ester of the formula (VII):

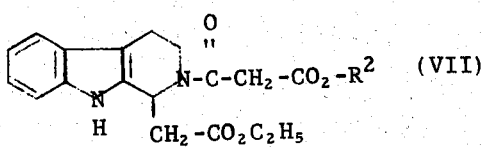

This material, in turn, converted by ring closure into compound (VIII):

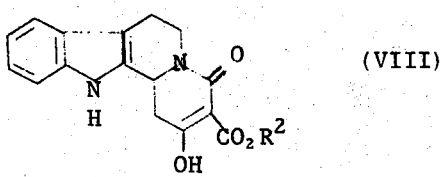

Reaction of compound (VIII) with diazomethane results in conversion into the methyl ether of formula (IX):

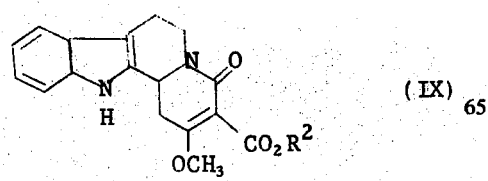

Treatment of compound IX with, for example, di-t-butyl malonate in the presence of sodium hydride then affords a compound of the formula (X):

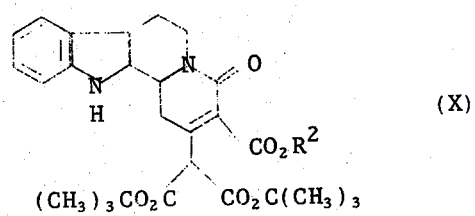

A compound having formula (XI) is next obtained upon treatment of acceptor. Examples of (X) with oxygen in the presence of a proton acceptor.

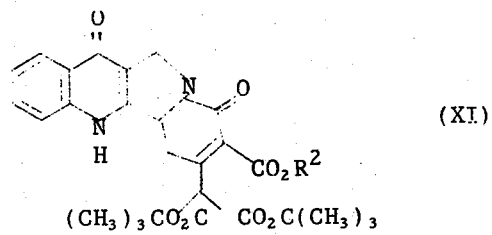

proton acceptors are alkali and alkaline earth metal alkoxides, alkali and alkaline earth metal hydrides, alkali and alkaline earth metal acetylides, alkali and alkaline earth metal amides, Grignard compounds, sterically hindered tertiary amines, strongly basic ion exchangers, and quaternary ammonium hydroxides. Mixtures of two or more of the said proton acceptors may also be used.

Compound (XI) May then be converted with thionyl chloride into the 4-chloroquinoline derivative (IIa) a compound of formula (II) where X is chlorine:

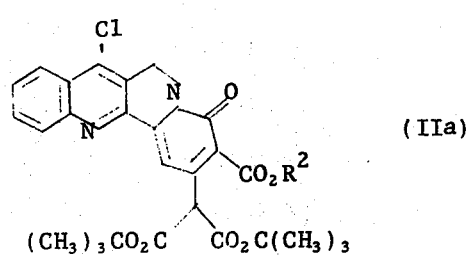

Compounds where X is bromine are obtained in an analogous manner with thionyl bromide.

Compounds of formula (II) where X is hydrogen are obtained by replacing the chlorine in the compound:

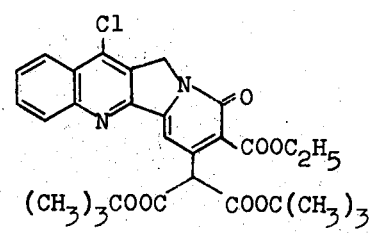

in a conventional manner reductively by hydrogen by means of a partially poisoned catalyst; for example palladium/barium sulfate is suitable as catalyst and methanol as solvent.

The compounds of formula (II) where X is alkoxy or dialkylamino are readily accessible from the corresponding compounds where X is chlorine or bromine or precursors thereof by exchanging the halogen using a conventional method.

It is convenient to carry out the reduction (II) → (III) by dissolving the compound of formula (II) in one of the said solvents and adding the reducing agent, preferably diisobutylaluminum hydride, in an approximately equivalent amount or in excess at a temperature of from about −50° to +50°C, preferably about −20°C. After about 30 minutes the whole is allowed to warm up to room temperature and the compound of formula (III) is isolated in the usual way.

Reaction of the compounds of formula (III) to give compounds of formula (IV) is carried out in the presence of acids, i.e. mineral acids such as sulfuric acid, hydrochloric acid, phosphoric acid and preferably trifluoroacetic acid. Examples of suitable solvents for the reaction are aprotic solvents such as the above-mentioned ethers, hydrocarbons, such as benzene, toluene and xylene, or chlorohydrocarbons such as methylene chloride, ethylene chloride, chloroform and chlorobenzene. When trifluoroacetic acid is used as the acid, an excess of the same may be used as the solvent.

Closure of the lactone ring may be carried out at a temperature of about −20°C to +50°C, preferably at room temperature, at which it is usually over after 45 to 90 minutes.

Alkylation of compounds of formula (IV) to compounds of formula (V) is carried out in the presence of strong bases such as phenyl lithium, potassium tertiary-butylate or preferably an alkali metal hydride, for example sodium hydride. Alkyl halides, preferably the iodides, are particularly suitable as alkylating agents.

Examples of individual compounds are methyl, ethyl, propyl or butyl bromide and the corresponding iodides.

Examples of suitable solvents for the reaction are dimethylformamide, N-methylpyrrolidone and dimethyl sulfoxide.

By introducing a hydroxyl group at the carbon atom of the compound of formula (V) which also bears the substituent $R^1$, camptothecin or a camptothecin derivative is obtained, particularly a compound of formula (I') and the corresponding compound with hydrogen instead of X' (= X). The introduction of the hydroxyl group may be carried out for example in a mixture of glacial acetic acid and water using cerium(IV)-ammonium nitrate.

Salts of the subgroup metals, for example of copper, silver, chromium, manganese, iron, cobalt, nickel, mercury, palladium or platinum, particularly copper(II) chloride, are particularly suitable as oxidation catalysts. The amount of catalyst is advantageously from about 1:1 to 10:1 (ratio by weight of substance to catalyst).

All compounds or liquids conventionally used for such oxidations are suitable as solvents for the compound (I), such as alcohols, for example methanol and tertiary-butanol; ethers, for example tetrahydrofuran, dioxane, ethylene glycol dimethyl ether, dimethylformamide, dimethyl sulfoxide and acetonitrile.

For the oxidation the solution should have approximately a weakly basic to weakly acid reaction, i.e. a pH of about 7.5 down to about pH 5, but pH 8 and pH 4 for example may also be used. Room temperature is preferred as the oxidation temperature, but the range from about 0°C to 80°C is generally suitable. The end of the oxidation according to the invention may be ascertained for example by thin layer chromatographic comparison of a sample of the reaction mixture with an authentic sample.

The small amount of dimethylamine which is contained in old dimethylformamide is adequate as the amine, in the presence of which oxidation to (I') is preferably carried out. Since dimethylformamide is preferred as the solvent for the oxidation of (I'), it is therefore not necessary to add dimethylamine if the dimethylformamide is old. Other amines, preferably secondary amines, which are capable of forming complexes with the oxidation catalyst may be used instead of dimethylamine. It is probably such amine complexes which particularly promote the course of the oxidation. Small or catalytic amounts of the amine are adequate. It is not necessary to give absolute amounts because one skilled in the art in the light of this description will have no difficulty in carrying out the invention in practice.

The advantages of this new synthesis over the method described by Stork and Schultz in J. Am. Chem. Soc., August 11, 1971, are as follows:

Compound (I) is obtainable in greater purity and in twelve steps from tryptamine (which is easily accessible), whereas the prior art method, starting from a less easily accessible compound, takes a total of seventeen steps. The yields of the process of the invention are good and it is possible to prepare a wide variety of camptothecin derivatives in which X may also have other meanings and/or the benzene ring may bear substituents, without much difficulty. The camptothecin derivatives are expected to be less toxic than the natural substance because of the greater susceptibility to attack of the quinoline system in metabolism.

In the following Examples, which illustrate the invention, parts and percentages are by weight unless otherwise stated.

EXAMPLE 1 a. 280 mg of the compound of the formula:

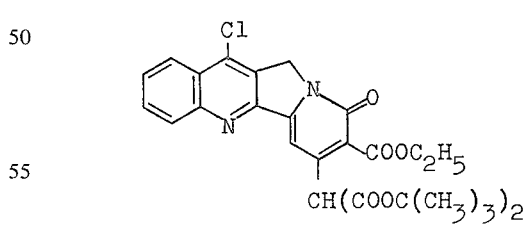

is dissolved in 30 ccm of ethylene glycol dimethyl ether. At −20°C 2.5 ccm of a 20% solution of diisobutylaluminum hydride in toluene is slowly added. Thirty minutes later the solution is allowed to heat up to room temperature and then 0.1-normal hydrochloric acid followed by saturated sodium carbonate solution are added and the whole is extracted with methylene chloride. The methylene chloride solution is washed with saturated sodium chloride solution and the solvent is evaporated. After recrystallization from acetone, 135 mg (65% of theory) of the carbinol (Z = CH₂OH) is obtained.

UV: 246, 293, 295, 365 mμ (qualitative)
IR: 3450, 1730, 1660, 1595 cm⁻¹
NMR: 8.5τ(18), 6.15τ(1), 5.2τ(2), 5.12τ(1), 4.8τ(2), 1.8 – 2.5τ(5)
Characterized as acetate.
Molecular ion: 554. Calculated: 554.

b. To produce the corresponding lactone of formula (IV), 190 mg of the carbinol thus obtained is allowed to stand in 3 ccm of trifluoroacetic acid for 45 minutes at room temperature. After the trifluoroacetic acid has been completely evaporated off, the lactone is obtained in a quantitative yield.

UV: 250, 290, 365 mμ (qualitative)
IR: 1560, 1600, 1660, 1740 cm⁻¹
NMR: 5.88τ(2), 4.25τ(2), 4.20τ(2), 2.04τ(1), 1.2 – 2.0τ(5)
Molecular ion: 338 Calculated: 338.

The lactone of formula (IV) where X = H may be prepared in the same way:

UV: 253, 295, 365 mμ (qualitative)
IR: 1570, 1600, 1660, 1740 cm⁻¹
NMR: 5.92τ(2), 4.2τ(2), 4.3τ(2), 1.5 – 2.0τ(6)
Molecular ion: 304 Calculated: 304.

The carbinols occurring as intermediates can also be converted directly into the lactones by allowing them to stand in trifluoroacetic acid.

c. 50 mg of the Cl-lactone is dissolved in 20 ccm of dimethylformamide, then 15 mg of a 50% suspension of NaH in spindle oil is added followed by the very slow dripping in of a solution of 35 mg of ethyl iodide in 5 ccm of dimethylformamide at room temperature in the course of 2 hours. After 15 hours at room temperature the solution is poured into dilute aqueous hydrochloric acid and extracted with methylene chloride. The methylene chloride phase is washed with dilute sodium bicarbonate solution and with saturated sodium chloride solution and concentrated. The residue is separated into the ethyl lactone and starting material by layer chromatography. (Interruption of the reaction at the stated time is advised because otherwise the corresponding dialkylation product as well as decomposition products are formed). Yield: 40% of theory.

UV: 365, 290, 254, 246 mμ
IR: 1620, 1660, 1740 cm⁻¹
NMR: 8.87τ(3) tr, 7.8τ(2) pent.
6.05τ(1) tr, 4.34τ(2), AB q J = 17
4.27τ(2) s, 2.08τ(1) s
1.3 – 1.9τ(4) m.
Molecular ion: 366 Calculated: 366
Ib: UV: 367, 290, 256 mμ
IR: 1610, 1660, 1740 cm⁻¹
Molecular ion: 332 Calculated: 332.

EXAMPLE 2

3 mg of desoxycamptothecin or chlorodesoxycamptothecin is dissolved in 3 ccm of dimethylformamide, then 1 mg of Cu(II)Cl₂ and a drop of aqueous dimethylamine solution are added and oxygen is passed in at room temperature. Six hours later the whole is poured into 0.01-normal hydrochloric acid and extracted with methylene chloride. After the solvent has been evaporated, 2.4 mg (80%) of the oxidized compound is obtained. Its properties when X = H (mass spectrum, UV spectrum, NMR spectrum and thin layer chromatographic RF value) are the same as those of natural camptothecin.

To produce desoxycamptothecin, the compound:

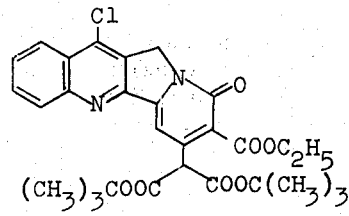

is dissolved in methanol (10 ccm CH₃OH for 100 mg of substance), 20 mg of Pd/BaSO₄ is added and hydrogenation is carried on until 1 mole of hydrogen has been absorbed (about 20 minutes). After filtering off the catalyst and evaporating in vacuo, 70 to 75% of the chlorine-free compound:

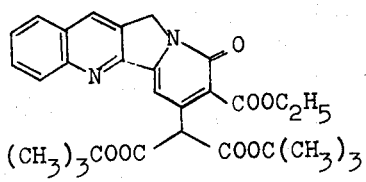

is obtained. This compound may be further processed by reduction, for example with diisobutyl aluminum hydride, and lactonization, for example with trifluoroacetic acid, as described in Example 1(a) and 1(b).

We claim:
1. A process for producing a compound of the formula:

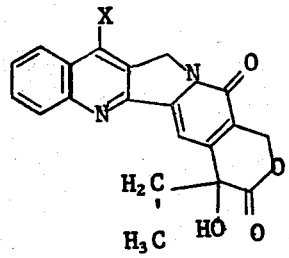

wherein X is a member of the group consisting of hydrogen and chlorine which comprises dissolving a compound of the formula

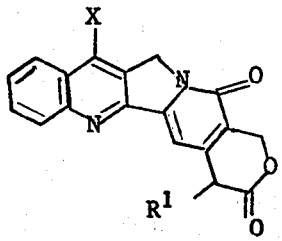

wherein R¹ is ethyl and X is selected from the group consisting of hydrogen and chlorine in a solvent, and selectively oxidizing said compound by allowing molecular oxygen to act thereon in the presence of a oxidation catalyst selected from the group consisting of salts of cerium (IV), copper, silver, chromium, manganese, iron, cobalt, nickel, mercury, palladium and platinum at a pH from about 8 to about 4.

2. A process as in claim 1 wherein X is hydrogen.

3. A process as in claim 1 wherein said pH is from about 7.5 to about 5 and wherein said oxidation is carried out at a temperature from about 0°C to 80°C.

4. A process as in claim 1 wherein said oxidation catalyst is copper (II) chloride.

* * * * *

UNITED STATES PATENT AND TRADEMARK OFFICE
CERTIFICATE OF CORRECTION

PATENT NO. : 3,894,029
DATED : July 8, 1975
INVENTOR(S) : Ekkehard Winterfeldt et al It is certified that error appears in the above-identified patent and that said Letters Patent are hereby corrected as shown below:

In Column 4, Line 17, delete " upon treatment of acceptor. Examples of (X) with oxygen in the presence of a proton acceptor." and substitute -- upon treatment of compound (X) with oxygen in the presence of a proton acceptor. Example of..--

Signed and Sealed this

Twenty-eighth Day of September 1976

[SEAL]

Attest:

RUTH C. MASON
Attesting Officer

C. MARSHALL DANN
Commissioner of Patents and Trademarks